(12) United States Patent
Wang

(10) Patent No.: US 12,298,828 B2
(45) Date of Patent: May 13, 2025

(54) METHOD AND DEVICE FOR PREDICTING REMAINING USE DURATION OF ELECTRONIC DEVICE BASED ON AN ADJUSTED CURRENT TOTAL POWER CONSUMPTION AND REMAINING ENERGY, AND STORAGE MEDIUM

(71) Applicant: BEIJING XIAOMI MOBILE SOFTWARE CO., LTD., Beijing (CN)

(72) Inventor: Xingcheng Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 84 days.

(21) Appl. No.: 17/976,741

(22) Filed: Oct. 28, 2022

(65) Prior Publication Data
US 2024/0004452 A1 Jan. 4, 2024

(30) Foreign Application Priority Data
Jul. 4, 2022 (CN) .......................... 202210846185.2

(51) Int. Cl.
| | | |
|---|---|---|
| G06F 1/32 | (2019.01) | |
| G06F 1/3212 | (2019.01) | |
| G06F 3/04817 | (2022.01) | |
| G06F 3/04847 | (2022.01) | |
| G06F 3/0488 | (2022.01) | |

(52) U.S. Cl.
CPC ........ *G06F 1/3212* (2013.01); *G06F 3/04817* (2013.01); *G06F 3/04847* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 8,958,854 B1 * | 2/2015 | Morley ............. | H04M 1/72448 712/15 |
| 2006/0015758 A1 * | 1/2006 | Yoon ..................... | G06F 1/3203 713/300 |
| 2007/0188144 A1 * | 8/2007 | Hara .................. | H04W 52/0277 320/132 |
| 2009/0094473 A1 * | 4/2009 | Mizutani ............... | G06F 1/3203 713/340 |

(Continued)

FOREIGN PATENT DOCUMENTS

| | | |
|---|---|---|
| CN | 113961060 A | 1/2022 |
| GB | 2529857 A | 3/2016 |

OTHER PUBLICATIONS

Extended European Search Report issued to EP Application No. 22204130.3 dated Jun. 23, 2023, (26p).

*Primary Examiner* — Danny Chan
(74) *Attorney, Agent, or Firm* — Arch & Lake LLP; Hao Tan; Shen Wang

(57) ABSTRACT

A method for predicting a remaining use duration of an electronic device is provided. The method includes: determining a current remaining energy of a battery based on state information of the battery in a current use scene; determining a current total power consumption of the electronic device in the current use scene; predicting the remaining use duration based on the current remaining energy and the current total power consumption; and displaying the remaining use duration through a display icon.

16 Claims, 7 Drawing Sheets

--- acquiring a first minimum power consumption for normal operation in the current use scene — S3021 reducing the current total power consumption to a first target power consumption range in response to determining that the target total power consumption is greater than or equal the first minimum power consumption, where the target total power consumption is a minimum value of the first target power consumption range — S3022

(56) References Cited

U.S. PATENT DOCUMENTS

| | | | |
|---|---|---|---|
| 2013/0021737 A1* | 1/2013 | Kokuryu | G06F 1/263 361/679.26 |
| 2013/0138989 A1* | 5/2013 | Jang | G06F 1/28 324/426 |
| 2016/0070326 A1* | 3/2016 | Hsiao | G06F 1/1626 713/320 |
| 2016/0073351 A1 | 3/2016 | Cardozo et al. | |
| 2016/0266742 A1* | 9/2016 | Hussain | G06F 3/04842 |
| 2017/0185134 A1* | 6/2017 | Han | G06F 1/26 |
| 2017/0195969 A1* | 7/2017 | Miao | H04W 52/0261 |
| 2018/0253135 A1* | 9/2018 | Singh | G06F 1/3212 |
| 2021/0123982 A1* | 4/2021 | Pantazis | G01R 31/3646 |
| 2021/0232201 A1* | 7/2021 | Chen | G06F 9/547 |

\* cited by examiner

METHOD AND DEVICE FOR PREDICTING REMAINING USE DURATION OF ELECTRONIC DEVICE BASED ON AN ADJUSTED CURRENT TOTAL POWER CONSUMPTION AND REMAINING ENERGY, AND STORAGE MEDIUM

CROSS REFERENCE TO RELATED APPLICATIONS

This application is filed based upon and claims priority to Chinese Patent Application No. 2022108461852, filed on Jul. 4, 2022, the entire content of which is incorporated herein by reference for all purposes.

TECHNICAL FIELD

The present disclosure relates to a field of information processing technologies, and particularly to a method and an apparatus for predicting a remaining use duration, an electronic device and a storage medium.

BACKGROUND

With the development of science and technology, more and more electronic devices are applied to various application fields. The electronic device usually includes a battery. The battery may be used by the electronic device for a certain period of time. When a battery power is lower than a certain power amount, the battery cannot continue supplying powers to the electronic device, and the electronic device stops working and can no longer be used.

During the use of an electronic device, a remaining use duration of the electronic device may be determined, which provides a certain reference for the subsequent use of the electronic device.

SUMMARY

According to a first aspect of the disclosure, a method for predicting a remaining use duration of an electronic device is provided. The method is performed by the electronic device. The method includes: determining a current remaining energy of a battery based on state information of the battery in a current use scene; determining a current total power consumption of the electronic device in the current use scene; predicting the remaining use duration based on the current remaining energy and the current total power consumption; and displaying the remaining use duration through a display icon.

According to a second aspect of the disclosure, an electronic device may include a processor and a memory storing non-transitory computer-readable instructions. When the instructions are executed by the processor, the processor is caused to: determine a current remaining energy of a battery based on state information of the battery in a current use scene; determine a current total power consumption of the electronic device in the current use scene; predict the remaining use duration based on the current remaining energy and the current total power consumption; and control a display of the remaining use duration through a display icon.

According to a third aspect of the disclosure, a non-transitory computer readable storage medium is stored with instructions. When the instructions are executed by the processor, a method for predicting a remaining use duration of an electronic device is carried out. The method includes: determining a current remaining energy of a battery based on state information of the battery in a current use scene; determining a current total power consumption of the electronic device in the current use scene; predicting the remaining use duration based on the current remaining energy and the current total power consumption; and displaying the remaining use duration through a display icon.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

Figure 1:
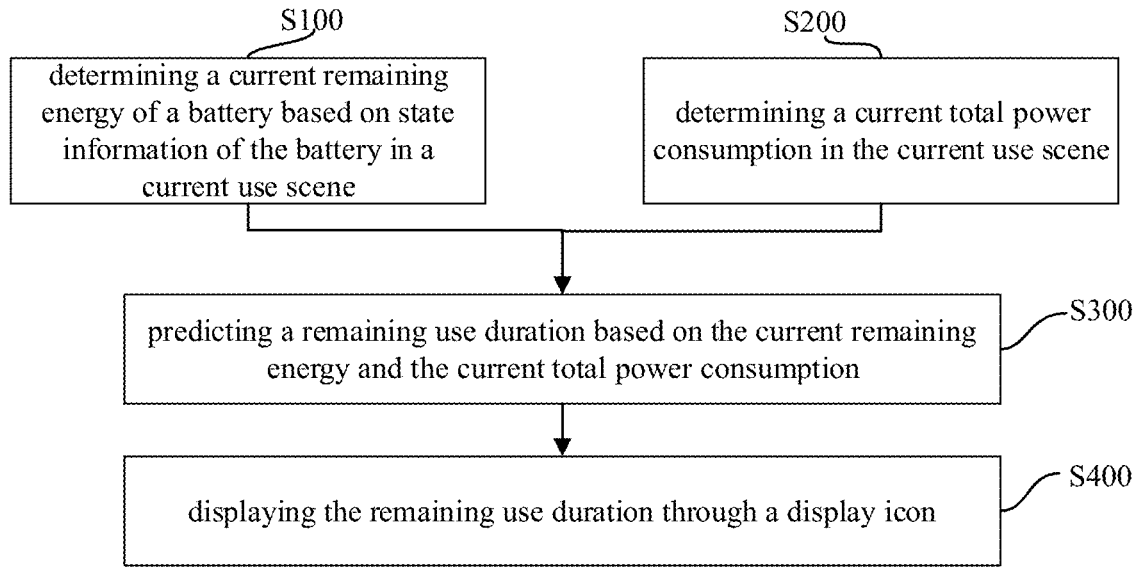
FIG. 1 is a diagram illustrating a method for predicting a remaining use duration of an electronic device according to an example.

The embodiments will be described in detail here, and their examples are shown in the accompanying drawings. When the following descriptions refer to the accompanying drawings, unless otherwise indicated, the same numbers in different drawings represent the same or similar elements. The implementations described in the following embodiments do not represent all implementations consistent with the present disclosure. Rather, they are examples of apparatuses consistent with some aspects of the disclosure as detailed in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It is of great significance for improving the user experience to predict a remaining use duration of an electronic device. Usually, the remaining use duration is predicted based on a remaining capacity and a current discharge current. For example, the remaining use duration is predicted by the ratio of the remaining capacity to the current discharge current. In the same use scene, most of power-consumption modules in the electronic device work in a constant power consumption mode, and a battery voltage gradually decreases during a discharge process of the battery, and change of voltage causes change of the discharge current. Due to the change of discharge current, the precision of calculating the remaining use duration in the use scene through a current discharge current is limited, resulting in a relatively low accuracy of predicting the remaining use duration, thus reducing the user experience.

In the disclosure, the current remaining energy of the battery in the current use scene and the current total power consumption in the current use scene are determined, the remaining use duration is predicted based on the current remaining energy and the current total power consumption, and the remaining use duration is displayed through the display icon.

Since a power consumption in the same use scene is basically unchanged, the remaining use duration may be predicted based on the current remaining energy and the current total power consumption of the battery in the current use scene, which improves the accuracy of determining a remaining use duration and avoids the situation that the accuracy of determining the remaining use duration is reduced due to a changed discharge current when the remaining use duration is determined based on a discharge current.

In addition, the remaining use duration may be displayed through the display icon, which improves the display effect of the remaining use duration, improves the convenience for the user to acquire the remaining use duration, and further enhances the user experience.

FIG. 1 is a diagram illustrating a method for predicting a remaining use duration of an electronic device according to an example. The method includes the following steps S100-S400.

At S100, a current remaining energy of a battery is determined based on state information of the battery in a current use scene.

At S200, a current total power consumption in the current use scene is determined.

At S300, a remaining use duration is predicted based on the current remaining energy and the current total power consumption.

At S400, the remaining use duration is displayed through a display icon.

The method may be performed at least by an electronic device with a battery. The electronic device may include a mobile electronic device and a fixed electronic device. That is, the method may be executed at least by a mobile electronic device and a fixed electronic device. The mobile electronic device may include a mobile phone, a tablet computer, an in-vehicle central control device, a wearable device, a smart device, etc., and the smart device may also include a smart office equipment and a smart home equipment.

For the step at S100, the current use scene of the electronic device may be determined based on a current running state of the electronic device, and the current running state of the electronic device may be determined based on a running state of an application program on the electronic device.

For example, when a game application is run in a foreground, it may be determined that the current running state of the electronic device is a game state, and the current use scene is a game scene. Power consumptions of different game applications may be different, and state information of the battery may also be different.

For another example, when a video application is run in the foreground, it may be determined that the current running state of the electronic device is a video playing state, and the current use scene is a video playing scene.

For another example, when a social application is run in the foreground, it may be determined that the current running state of the electronic device is a social application running state.

When the current use scenes are different, the state information of the battery is at least partially different, and the state information of the battery may include a current voltage, a discharge current, and a state of charge (SOC) of the battery. The state information of the battery in the current use scene may be acquired, and there are various ways for acquiring state information of the battery, for example, acquiring through a detector. The current remaining energy of the battery may be determined based on state information of the battery when state information of the battery in the current use scene is acquired. The way for determining the current remaining energy of the battery based on the state information of the battery is not limited here, within a protection scope of the embodiment.

For the step at S200, the current total power consumption in the current use scene may be determined. When the current use scene is determined, a current total power consumption of the electronic device in the current use scene may be determined. In the same current use scene, the total power consumption of the electronic device may be maintained within a certain range, and the current total power consumption in the current use scene may be determined based on an average total power consumption within the range.

When the current use scenes are different, the corresponding total power consumptions may be different. The total power consumption may be a sum of power consumptions of power consumption modules in the electronic device, and a total power consumption of the electronic device may be determined based on the power consumptions of each power consumption module. The way for determining the power consumption of each power consumption module is not limited, and a power consumption detection way may be used.

The steps at S100 and at S200 do not have a necessary sequence relationship, and may be performed in any sequence.

For the step at S300, when the current remaining energy and the current total power consumption are determined, since the product of a power consumption and a time is a consumed battery energy, the remaining use duration is predicted based on the current remaining energy and the current total power consumption.

Since a power consumption in the same use scene is maintained within a certain range and basically unchanged, the remaining use duration may be predicted based on the current remaining energy and the current total power consumption of the battery in the current use scene, which improves the accuracy of determining the remaining use duration and avoids the situation that the accuracy of determining the remaining use duration is reduced due to a changed discharge current when the remaining use duration is determined based on a discharge current.

For the step at S400, when the remaining use duration is predicted, the remaining use duration may be displayed through the display icon. The display icon may be a system-level icon displayed on a system interface. The display priority of the display icon is higher than a display priority of an application program, that is, the display layer of the display icon is above the display level of the application program, and the display icon may block and cover the application program.

For example, when the application program is running, the display layer where the display icon is located is higher than the display layer where the application program is located.

The display icon may be a preset icon that may display a remaining use duration. The size, style, color, and position of the display icon are not limited, and may be determined based on the actual usage needs. Configuration parameters of display icons are different, and display effects of the display icons are different.

The remaining use duration may be displayed through the display icon, which improves the display effect of the remaining use duration, improves the convenience for the user to acquire a remaining use duration, and further enhances the user experience.

In an embodiment, since the running duration of the electronic device increases, the current remaining energy gradually decreases, and the current remaining energies determined at different time are different. When a remaining use duration is predicted at different time, the current remaining energy and the current total power consumption need to be determined again. That is, the current remaining energy needs to be constantly determined. The current remaining energy may be determined every other first preset detection period, for updating the current remaining energy. Then, a remaining use duration is predicted based on the updated current remaining energy and the current total power consumption at corresponding time.

The current remaining energy may be determined based on the first preset detection period, the current total power consumption may be determined based on a second preset detection period, in which the first preset detection period and the second preset detection period may be the same. The current remaining energy is determined every other first preset detection period, and the current total power consumption is determined every other second preset detection period. The units of the first preset detection period and the second preset detection period may be seconds or milliseconds, etc., which are determined based on actual needs.

The time for determining the current remaining energy and the time for determining the current total power consumption may be the same, so that the predicted remaining use duration may be determined based on the current remaining energy and the current total power consumption at the same time, thus improving the accuracy of determining the remaining use duration.

For example, the first preset detection period is 10s, the second preset detection period is also 10s, and the time for determining the current remaining energy based on the first preset detection period is first time, to obtain a first current remaining energy. The time for determining the current total power consumption based on the second preset detection period is also the first time, to obtain a first current total power consumption. The ratio of the first current remaining energy to the first current total power consumption is the remaining use duration predicted at the first time.

The current remaining energy is determined every other first preset period to obtain a second current remaining energy, and a current total power consumption is determined every other second preset period to obtain a second current total power consumption. The ratio of the second current remaining energy to the second current total power consumption is an updated remaining use duration, that is, a remaining use duration predicted at the second time.

Figure 2:
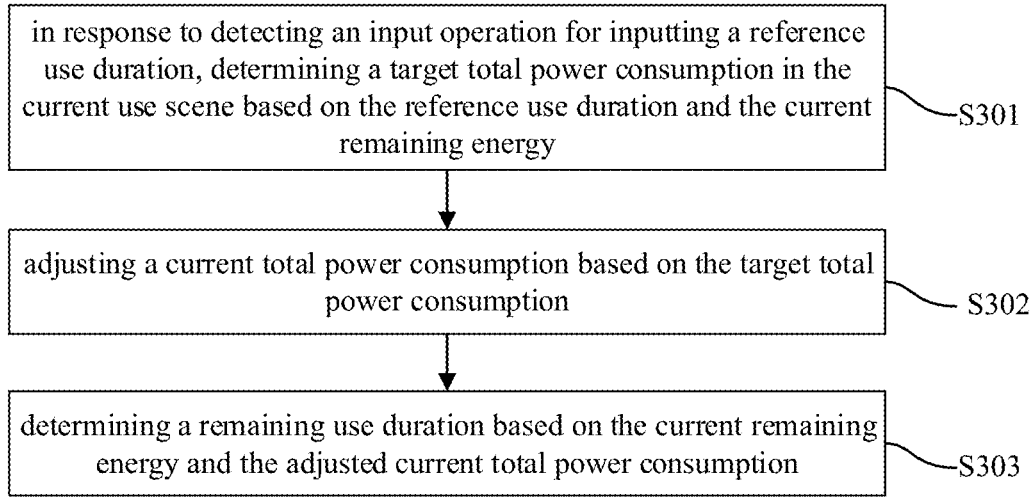
FIG. 2 is a flowchart diagram of predicting a remaining use duration according to an example.

In another embodiment, FIG. 2 is a flowchart diagram of predicting a remaining use duration. Predicting the remaining use duration based on the current remaining energy and the current total power consumption at S300, includes the following steps at S301-S303.

At S301, a target total power consumption in the current use scene is determined based on a reference use duration and the current remaining energy in response to detecting an input operation for inputting the reference use duration.

At S302, the current total power consumption is adjusted based on the target total power consumption.

At S303, the remaining use duration is determined based on the current remaining energy and the adjusted current total power consumption.

For the step at S301, when the input operation for inputting the reference use duration is detected, indicating that the reference use duration has been input, the target total power consumption in the current use scene may be determined based on the reference use duration and the current remaining energy. The ratio of the current remaining energy to the reference use duration is the target total power consumption in the current use scene. The target total power consumption is a power consumption needed by continuing using the reference use duration in the current use scene under the premise of the current remaining energy. When the total power consumption of the electronic device is the target total power consumption, the current remaining power of the electronic device in the current use scene may enable the electronic device to run in the reference use duration.

In an embodiment, the display icon further has an input function that may be achieved through an input interface. The electronic device may detect an input operation acting on the display icon, in which the input operation is an operation for inputting the reference use duration, and the reference use duration is a use duration for continuing running based on the user needs in the current use scene. For example, the reference use duration is 5s.

When the input operation acting on the display icon for inputting the reference use duration is detected, the input interface for the reference use duration may be displayed, and the reference use duration may be input through the input interface based on the input operation.

In an embodiment, the input operation may include a trigger operation for displaying an input interface and an operation for inputting a reference use duration. The input interface is displayed when the trigger operation for displaying the input interface is detected, and the reference use duration is input when the operation for inputting the reference use duration is detected.

For the step at S302, the target total power consumption may be different from the current total power consumption. When the target total power consumption is different from the current total power consumption, the current total power consumption is adjusted based on the target total power consumption, and the adjusted current total power consumption is close to or equal to the target total power consumption, so that the remaining use duration may be adjusted to the reference use duration.

In an embodiment, the target total power consumption is less than the current total power consumption, so that the current total power consumption may be reduced based on the target total power consumption, thus extending the remaining use duration that may maintain the electronic device running in the current use scene based on the current remaining energy.

In an embodiment, the target total power consumption is greater than the current total power consumption, so that the current total power consumption is increased based on the target total power consumption, thus improving a running effect in the current use scene, such as improving a sound effect, a volume, and increasing an image quality by enhancing a frame rate, further improving the user experience.

For the step at S303, when the current total power consumption is adjusted, the remaining use duration is determined based on the current remaining energy and the adjusted current total power consumption. The remaining use duration obtained in this way is a remaining use duration predicted based on the current remaining energy and the adjusted current total power consumption.

In an embodiment, when the input operation acting on the display icon is not detected, the remaining use duration may be directly determined by the current remaining energy and the current total power consumption. For example, the ratio of the current remaining energy to the current total power consumption is the remaining use duration.

Figure 3:
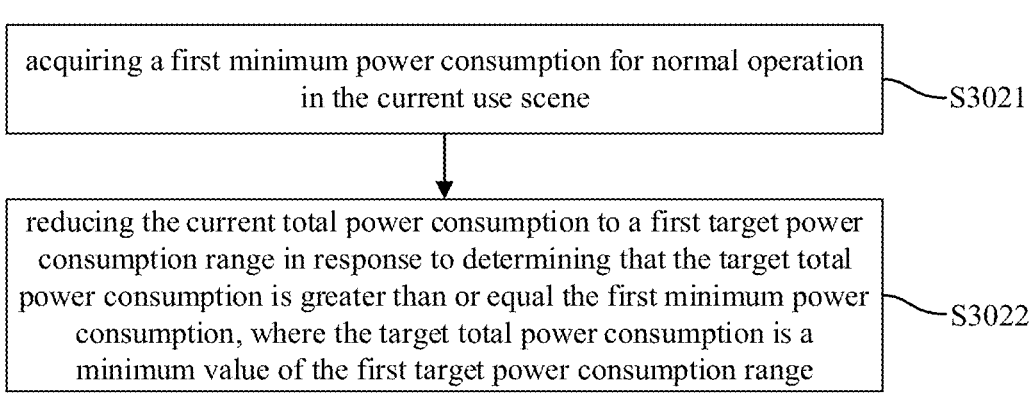
FIG. 3 is a flowchart diagram of adjusting a current total power consumption according to an example.

In another embodiment, FIG. 3 is a flowchart diagram of adjusting a current total power consumption. Adjusting a current total power consumption based on the target total power consumption at S302, includes the following steps at S3021-S3022.

At S3021, a first minimum power consumption for normal operation in the current use scene is acquired.

At S3022, the current total power consumption is reduced to a first target power consumption range in response to determining that the target total power consumption is greater than or equal the first minimum power consumption. The target total power consumption is a minimum value of the first target power consumption range.

The first minimum power consumption of the electronic device for normal operation in the current use scene is determined, the first minimum power consumption enable the electronic device to maintain normal operation in the current use scene. That is, the first minimum power consumption is a minimum power consumption of the electronic device in the current use scene. When it is determined that the target total power consumption is greater than or equal to the first minimum power consumption, it is indicated that, since the remaining energy at a certain moment is certain, and the total power consumption of the electronic device is inversely proportional to the remaining use duration, the remaining use duration of the electronic device is less than or equal to the reference use duration when the total power consumption of the electronic device is the target total power consumption. The current total power consumption may be adjusted based on the target total power consumption, to reduce the current total power consumption, so that the remaining use duration may be prolonged, a difference value between the remaining use duration and the reference use duration may be reduced, and accuracy of predicting the remaining use duration is improved.

The current total power consumption may be reduced to the target total power consumption, or may be reduced within a first target power consumption range. The minimum value of the first target power consumption range is the target total power consumption, and the maximum value may be a power consumption value having a difference value with the target total power consumption, which is a preset value. The current total power consumption is reduced within a range (e.g., the first target power consumption range), which may achieve adjustment of the current total power consumption.

The closer the adjusted current total power consumption is to the target total power consumption, that is, the smaller the difference value between the adjusted current total power consumption and the target total power consumption, the higher the accuracy of the predicted remaining use duration.

Figure 4:
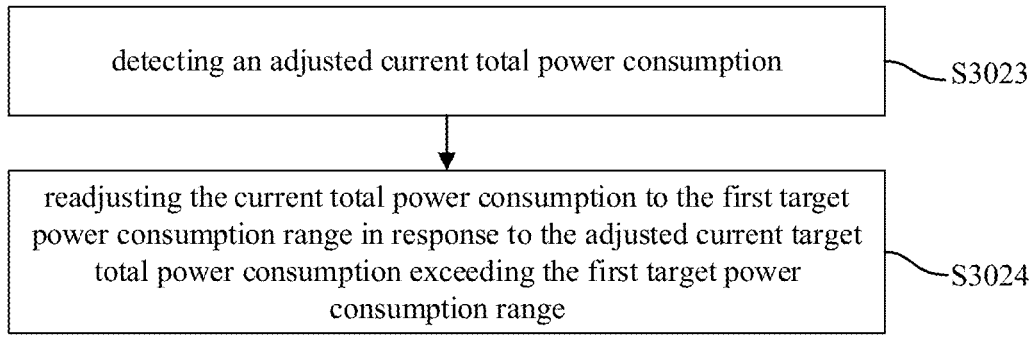
FIG. 4 is another flowchart diagram of adjusting a current total power consumption according to an example.

In another embodiment, FIG. 4 is another flowchart diagram of adjusting a current total power consumption. The method further includes the following steps at S3023-S3024.

At S3023, an adjusted current total power consumption is detected.

At S3024, the current total power consumption is readjusted to the first target power consumption range in response to the adjusted current target total power consumption exceeding the first target power consumption range.

The steps at S3023 and S3024 are processes for detecting and readjusting a current total power consumption adjusted at S3021 and S3022, and they may be executed after step S3022. When the current total power consumption is adjusted through S3021 and S3022, the adjusted current total power consumption through S3021 and S3022 is detected. When it is detected that the adjusted current total power consumption exceeds the first target power consumption range, the current total power consumption is readjusted to the first target power consumption range. In this way, the accuracy of adjusting the current total power consumption may be improved, thus reducing the problem of a relatively low accuracy of adjusting the current total power consumption due to the fact that the adjusted current total power consumption exceeds the first target power consumption range again, and further improving the accuracy of the predicted remaining use duration.

In another embodiment, the method further includes: outputting a prompt message through a display icon in response to determining that target total power consumption is less than first minimum power consumption, in which the prompt message is configured to prompt that the reference use duration is too long.

Since the first minimum power consumption is a minimum power consumption of the electronic device in the current use scene, the remaining use duration of the electronic device at the first minimum power consumption is the longest in the current use scene, and the longest remaining use duration of the electronic device is a remaining use duration at the first minimum power consumption.

When the target total power consumption is less than the first minimum power consumption, although the target total power consumption is reduced, the electronic device cannot be normally operated at a total power consumption less than the first minimum power consumption in the current use scene. In the current use scene, the remaining use duration of the electronic device at the current total power consumption is less than the remaining use duration at the target total power consumption. In other words, the remaining use duration at the current total power consumption is not up to the remaining use duration of the electronic device at the target total power consumption. Therefore, prompt information needs to be output, which may prompt that the target total power is too small, and the remaining use duration predicted based on the target total power is too long, so that the remaining use duration at the current total power consumption cannot be up to the remaining use duration predicted based on the target total power.

In an embodiment, the target total power consumption may be increased to be greater than or equal to the first minimum power consumption, and the target total power consumption may be adjusted by adjusting the reference use duration. The reference use duration may be adjusted by redetecting an input operation, an updated reference use duration may be determined based on the redetected input operation, and an updated target total power consumption may be determined based on the updated reference use duration.

Figure 5:
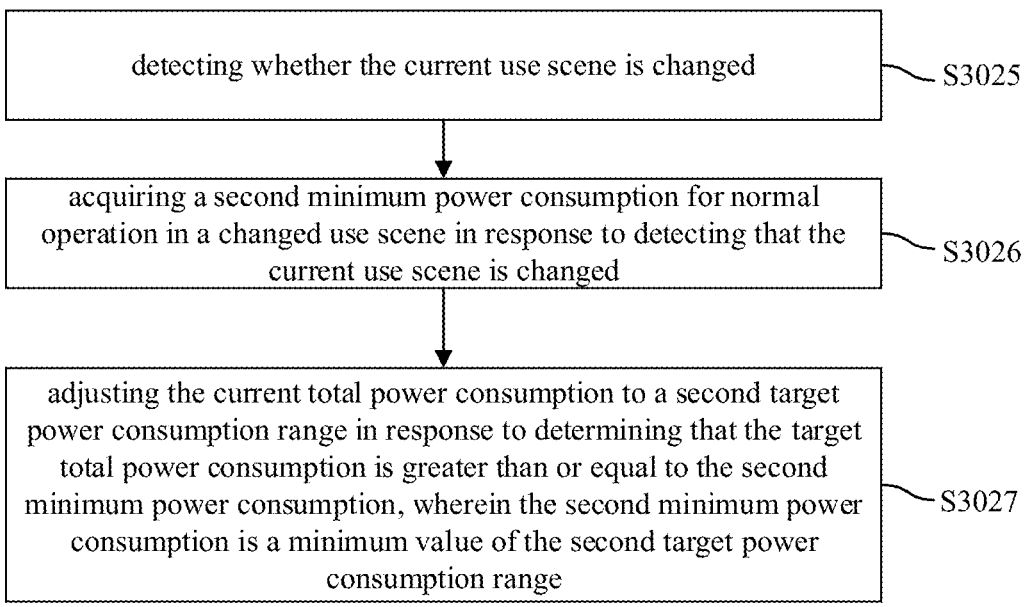
FIG. 5 is another flowchart diagram of adjusting a current total power consumption according to an example.

In another embodiment, FIG. 5 is another flowchart diagram of adjusting a current total power consumption. Adjusted the current total power consumption based on the target total power consumption at S302 includes the following steps at S3025-S3027.

At S3025, it is detected whether the current use scene is changed.

At S3026, a second minimum power consumption for normal operation in a changed use scene is acquired in response to detecting that current use scene is changed.

At S3027, the current total power consumption is adjusted to a second target power consumption range in response to determining that the target total power consumption is greater than or equal the second minimum power consumption. The second power consumption is a minimum value of the second target power consumption range.

Since the total power consumptions in different use scenes are different, and when the current use scene is changed, the total power consumption of the electronic device may be changed when the current use scene is changed, it needs to detect whether the current use scene is changed.

When the current use scene is not changed, the current total power consumption is adjusted by the first minimum power consumption for normal operation in the current use scene and the target total power consumption. The steps at S3021 and S3022 may be referred for details.

The second minimum power consumption for normal operation in the changed use scene is acquired in response to detecting that current use scene is changed. Since the current use scene is changed, the current total power consumption is adjusted based on the minimum power consumption in the changed use scene and the target total power consumption. The minimum power consumption in the changed use scene is denoted as the second minimum power consumption. The second minimum power consumption is capable of maintaining normal operation of the electronic device in the changed use scene, that is, the second minimum power consumption is the minimum power consumption of the electronic device in the changed use scene.

The current total power consumption is adjusted to the second target power consumption range in response to determining that the target total power consumption is greater than or equal to the second minimum power consumption. The second power consumption is a minimum value within the second target power consumption range.

When it is determined that the target total power consumption is greater than or equal to the second minimum power consumption, indicating that when the total power consumption of the electronic device is the target total power consumption, the remaining use duration of the electronic device is less than the reference use duration, so that the current total power consumption in the changed use scene may be adjusted based on the target total power consumption, so as to reduce the current total power consumption in the changed use scene, thus prolonging the remaining use duration, reducing a difference value between the remaining use duration and the reference use duration, and improving the prediction accuracy of the remaining use duration.

The current total power consumption in the changed use scene may be reduced to the target total power consumption, or within the second target power consumption range, in which the minimum value of the second target power consumption range is the target total power consumption, and the maximum value of the second target power consumption range may be a power consumption value having a difference value with the target total power consumption, which is a preset value. The current total power consumption is reduced within a range, and when the current total power consumption in the changed use scene is adjusted within the second target power consumption range, adjustment of the current total power consumption in the changed use scene is achieved.

In the changed use scene, the closer the current total power consumption adjusted based on the target total power consumption, is to the target total power consumption, that is, the smaller the difference value between the adjusted current total power consumption in the changed use scene and the target total power consumption, the higher the accuracy of the predicted remaining use duration.

Figure 6:
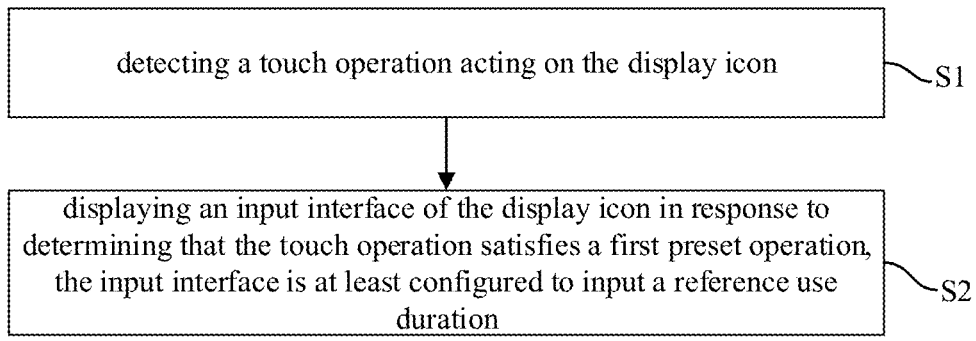
FIG. 6 is a flowchart diagram of inputting a reference use duration according to an example.

In another embodiment, FIG. 6 is a flowchart diagram of inputting a reference use duration. The method includes the following steps at S1-S2.

At S1, a touch operation acting on the display icon is detected.

At S2, an input interface of the display icon is displayed in response to determining that the touch operation satisfies a first preset operation. The input interface is at least configured to input a reference use duration.

By detecting the touch operation acting on the display icon, the input interface of the reference use duration may be displayed. When the touch operation is detected, the input interface of the reference use duration is displayed when it is determined that the touch operation satisfies the first preset operation. The first preset operation is an operation of displaying a reference use duration. When it is detected that the touch operation acting on the display icon satisfies the first preset operation, it is indicated that the touch operation is the first preset operation, and configured to input a reference use duration. The first preset operation may be determined based on the user needs, such as single clicking, double clicking, sliding up or down.

The reference use duration may be input through an input interface and an input operation.

The display form of the input interface is not limited, and may include the size, the style, the color and the layout of displaying.

Figure 7:
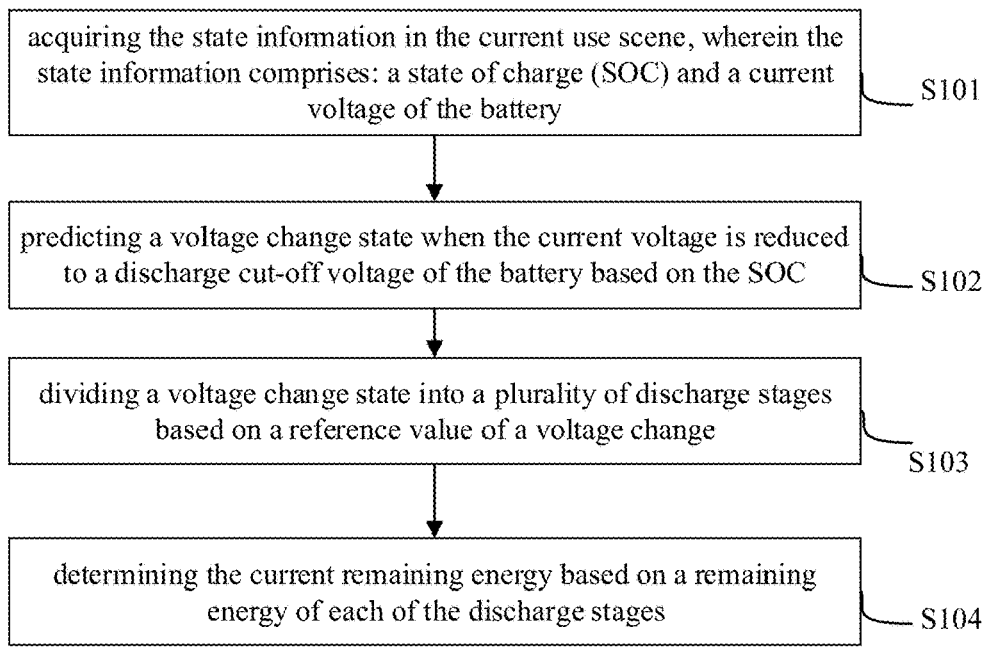
FIG. 7 is a flowchart diagram of determining a current remaining energy according to an example.

In another embodiment, FIG. 7 is a flowchart diagram of determining a current remaining energy. At S100, determining the current remaining energy of the battery based on the state information of the battery in the current use scene includes the following steps at S101-S104.

At S101, the state information in the current use scene is acquired. The state information includes: a state of charge (SOC), a current and a voltage of the battery at the current moment.

At S102, a voltage change state when the voltage is reduced to a discharge cut-off voltage of the battery is predicted based on the SOC.

At S103, the voltage change state is divided into a plurality of discharge stages based on a reference value of a voltage change.

At S104, the current remaining energy is determined based on the remaining energy of each of the discharge stages.

When the current remaining energy is determined, the acquired state information of the battery in the current use scene may be displayed, in which the state information may include the SOC, the current and the voltage of the battery at the current moment. When the state information of the battery is acquired, the voltage change state when the voltage is reduced to the discharge cut-off voltage of the battery may be predicted based on the state information of the battery, for example, the voltage change state may be a changing curve. Based on a changing curve between an open circuit voltage (Uocv) of the battery and SOC, there is a correlation function between the Uocv and the SOC.

The Uocv may be determined based on a voltage at both ends of the battery and a voltage at both ends of a battery internal resistance. When the current of the battery is determined, the voltage at both ends of the battery internal resistance may be determined based on the current and the battery internal resistance, and the Uocv is equal to a sum of the voltage at both ends of the battery internal resistance and the voltage at both ends of the battery.

The SOC at t moment may be determined based on a variation of a determination period of the SOC and the SOC at t−1 moment. The difference value between t−1 moment and t moment is the determination period T of the SOC. The difference value between the SOC at t moment and the SOC at t−1 moment is the variation of the determination period of the SOC. The determination period of the SOC may also be referred to as a time interval for determining SOCs at different moments.

The SOC of the battery when the current voltage is reduced to the discharge cut-off voltage may be determined based on the SOC at each moment. Based on the SOC when the current voltage is reduced to the discharge cut-off voltage and the correlation between the Uocv and the SOC of the battery, a voltage change state may be determined, to obtain a voltage changing curve.

The reference value of voltage change is configured to represent a voltage value for dividing the voltage change state. Each time the battery voltage changes one reference value, the voltage change state is divided. When the battery is discharged, the battery voltage decreases. Each time the battery voltage decreases by one reference value, the voltage change state is divided, so as to obtain a discharge stage. In this way, the voltage change state may be divided into a plurality of discharge stages based on the reference value of voltage change.

The reference value may be determined based on the actual needs, which may be millivolts in unit, such as 10 millivolts. For one discharge stage, the battery voltage at the discharge stage is unchanged, that is, the current voltage at the same discharge state is fixed. Voltages at different discharge states are different.

Then, the current remaining energy is determined based on the remaining energy at each discharge stage. The remaining energy at each discharge stage may be determined based on the time, the current and the voltage used at the discharge stage. The product of the above three items (the time, the current and the voltage used at the discharge stage) is the remaining energy at the discharge stage.

The voltage change state is divided by determining the voltage change state of the battery. When the battery voltage is decreased by one reference value each time, the voltage change state of the battery is divided into one discharge stage, so that the decreasing state of the battery voltage is divided into the plurality of discharge stages, thus improving the accuracy of determining the voltage change state of the battery. When the accuracy of the battery voltage change is improved, the remaining energy at each discharge stage may be determined, thus improving the accuracy of determining the current remaining energy of the battery based on the remaining energy at each discharge stage.

In another embodiment, at S400, displaying the remaining use duration through the display icon includes: detecting a touch operation acting on the display icon; and displaying the remaining use duration in response to determining that the touch operation satisfies a second preset operation.

When the touch operation acting on the display icon is detected, it is determined whether the touch operation satisfies the second preset operation, and the second preset operation is an operation of displaying a remaining use duration. When the touch operation satisfies the second preset operation, it is indicated that the touch operation is an operation of displaying a remaining use duration, the remaining use duration may be displayed based on the operation.

The second preset operation may be determined based on the user needs, such as single clicking, double clicking, sliding up or down. The second preset operation is different from the first preset operation.

Figure 8:
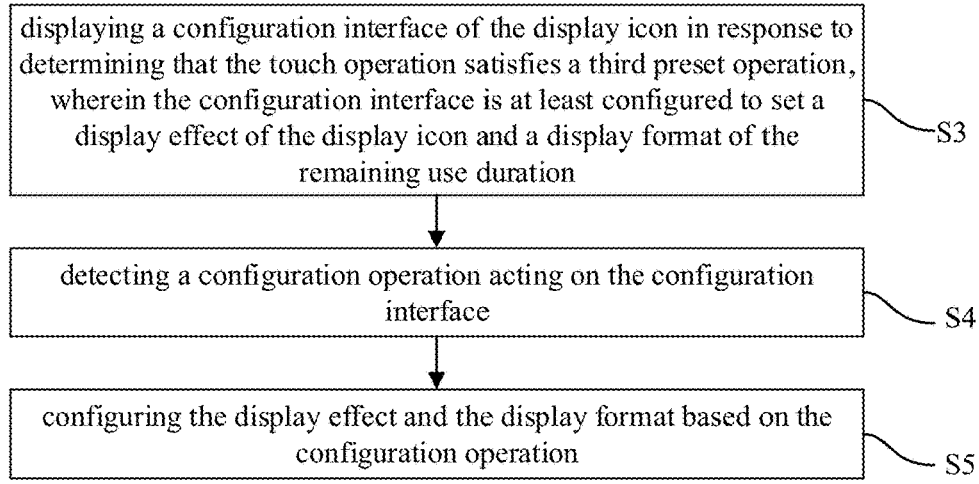
FIG. 8 is a flowchart diagram of processing another touch operation according to an example.

In another embodiment, FIG. 8 is a flowchart diagram of processing another touch operation. The method further includes the following steps at S3-S5.

At S3, a configuration interface of the display icon is displayed in response to determining that the touch operation satisfies a third preset operation. The configuration interface is at least configured to set a display effect of the display icon and a display format of the remaining use duration.

At S4, a configuration operation acting on the configuration interface is detected.

At S5, the display effect and the display format are configured based on the configuration operation.

The third preset operation is an operation configured to display a configuration interface. When it is detected that a touch operation satisfies a third preset operation, it is indicated that the touch operation is an operation of displaying a configuration interface, a configuration interface is displayed based on the touch operation. The configuration interface is at least configured to set the display effect of the display image and the display format of the remaining use duration. The configuration interface includes a configuration sub-interface for the display effect and a configuration sub-interface for the display format. The display effect may be a display effect of the display icon, and may also be display effects of the configuration interface and other display interface based on the display icon.

The display effect may include: transparency, size, color, shape and/or layout format, etc. of displaying. The display effect may include: a countdown format, a digital format and a dial format, and a format of "hmin**s."

When the configuration interface is displayed, a configuration operation acting on the configuration interface may be detected. The configuration operation may be an operation matching the configuration interface, and may be used to configure the configuration interface. The configuration operation may include a configuration operation of the display effect, and may also include a configuration operation of the display format. The display effect may be configured by the configuration operation of the display effect, and the display format may be configured by the configuration operation of the display format.

In another embodiment, the configuration interface may also include a configuration sub-interface including a list for the detailed power consumption, which is used to configure a display of the list of the detailed power consumption. The current total power consumption and a sub power consumption of each power consumption module may be displayed, in which a sum of sub power consumptions is equal to the current total power consumption. The configuration operation acting on the configuration sub-interface for the list of the detailed power consumption is detected, to adjust a display of the list of the detailed power consumption.

Figure 9:
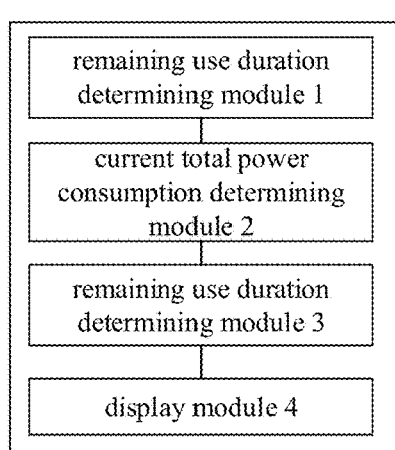
FIG. 9 is a diagram illustrating an apparatus for predicting a remaining use duration of an electronic device according to an example.

In another embodiment, FIG. 9 is a diagram illustrating an apparatus for predicting a remaining use duration of an electronic device according to an example. The apparatus includes a current remaining energy determining module 1, a current total power consumption determining module 2, a remaining use duration determining module 3 and a display module 4.

The current remaining energy determining module 1 is configured to determine a current remaining energy of a battery based on state information of the battery in a current use scene.

The current total power consumption determining module 2 is configured to determine a current total power consumption in the current use scene.

The remaining use duration determining module 3 is configured to predict a remaining use duration based on the current remaining energy and the current total power consumption.

The display module 4 is configured to display the remaining use duration through a display icon.

In another embodiment, the remaining use duration determining module 3 includes: a target total power consumption determining unit, an adjustment unit and a prediction unit.

The target total power consumption determining unit is configured to in response to detecting an input operation for inputting a reference use duration, determine a target total power consumption in the current use scene based on the reference use duration and the current remaining energy.

The adjustment unit is configured to adjust the current total power consumption based on the target total power consumption.

The prediction unit is configured to predict the remaining use duration based on the current remaining energy and the adjusted current total power consumption.

In another embodiment, the adjustment unit includes: a first minimum power consumption determining subunit and a first adjustment subunit.

The first minimum power consumption determining subunit is configured to acquire a first minimum power consumption for normal operation in the current use scene.

The first adjustment subunit is configured to reduce the current total power consumption to a first target power consumption range in response to determining that the target total power consumption is greater than or equal to the first minimum power consumption. The target total power consumption is a minimum value of the first target power consumption range.

In an embodiment, the apparatus further includes: a detection subunit and a first readjustment subunit.

The detection subunit is configured to detect an adjusted current total power consumption.

The first readjustment subunit is configured to readjust the current total power consumption to the first target power consumption range in response to the adjusted current target total power consumption exceeding the first target power consumption range.

In an embodiment, the apparatus further includes: a prompt message output module.

The prompt message output module is configured to output a prompt message in response to determining that the target total power consumption is less than the first minimum power consumption. The prompt message is configured to prompt that the reference use duration is too long.

In another embodiment, the adjustment unit includes: a scene detection subunit, a second minimum power consumption determining subunit and a second readjustment subunit.

The scene detection subunit is configured to detect whether the current use scene is changed.

The second minimum power consumption determining subunit is configured to acquire a second minimum power consumption for normal operation in a changed use scene in response to detecting that the current use scene is changed.

The second readjustment subunit is configured to adjust the current total power consumption to a second target power consumption range in response to determining that the target total power consumption is greater than or equal to the second minimum power consumption. The second power consumption is a minimum value of the second target power consumption range.

In another embodiment, the apparatus further includes: a first touch operation detection unit and an input interface display unit.

The first touch operation detection unit is configured to detect a touch operation acting on the display icon.

The input interface display unit is configured to display an input interface of the display icon in response to determining that the touch operation satisfies a first preset operation, in which the input interface is at least configured to input the reference use duration.

In another embodiment, the remaining use duration determining module 1 includes: a state information acquiring unit, a voltage change state determining unit, a dividing unit and a current remaining energy determining unit.

The state information acquiring unit is configured to acquire the state information in the current use scene. The state information includes: a state of charge (SOC) and a current voltage of the battery.

The voltage change state determining unit is configured to predict a voltage change state when the current voltage is reduced to a discharge cut-off voltage of the battery based on the SOC.

The dividing unit is configured to divide the voltage change state into a plurality of discharge stages based on a reference value of a voltage change.

The current remaining energy determining unit is configured to determine the current remaining energy based on the remaining energy of each of the discharge stages.

In another embodiment, the display module 4 includes: a second touch operation detection unit and a first display unit.

The second touch operation detection unit is configured to detect a touch operation acting on the display icon.

The first display unit is configured to display the remaining use duration in response to determining that the touch operation satisfies a second preset operation.

In another embodiment, the apparatus further includes: a configuration interface display unit, a configuration interface detection unit and a configuration unit.

The configuration interface display unit is configured to display a configuration interface of the display icon in response to determining that the touch operation satisfies a third preset operation. The configuration interface is at least configured to display a display effect of the display icon and a display format of the remaining use duration.

The configuration interface detection unit is configured to detect a configuration operation acting on the configuration interface.

The configuration unit is configured to set the display effect and the display format based on the configuration operation.

In another embodiment, the display icon is a system-level display icon.

In another embodiment, an electronic device is further provided. The electronic device includes: a processor and a memory configured to store executable instructions capable of being run on the processor. When the executable instructions are executed by the processor, the method as described in the any embodiment above is carried out.

In another embodiment, a non-transitory computer readable storage medium with computer executable instructions stored is further provided. When the computer executable instructions are executed by the processor, the method as described in the any embodiment above is carried out.

In another embodiment, a solution of predicting and displaying a remaining use duration for which a mobile phone may be running in a current scene. When a user performs a behavior to the mobile phone such as playing a game and watching a short video, the user may acquire a remaining duration for which the mobile phone may keep running. It is of great significance for the user to reasonably arrange game time. Meanwhile, the use experience for the mobile terminal may be improved.

A display icon may be provided on a display interface of the mobile phone, the display icon may be a button. The available time may be displayed or hidden (i.e., not displayed) by clicking the button. The displayed available time may vary depending on the use scene. Therefore, it is possible to provide the user with a more intuitive available time in real time. An option of increasing the available time is provided for the user to select. For example, increasing the available time is achieved by reducing a screen brightness or a game frame rate. The user is allowed to select the available time, and the system adjusts a power consumption based on the selected available time. The key point of the function is to achieve accurate prediction of the available time in the current scene. Various functional modules of the present disclosure are described below.

Based on the solution of displaying the remaining available time in the disclosure, the user may acquire a remaining use duration of an accurate power.

Figure 10:
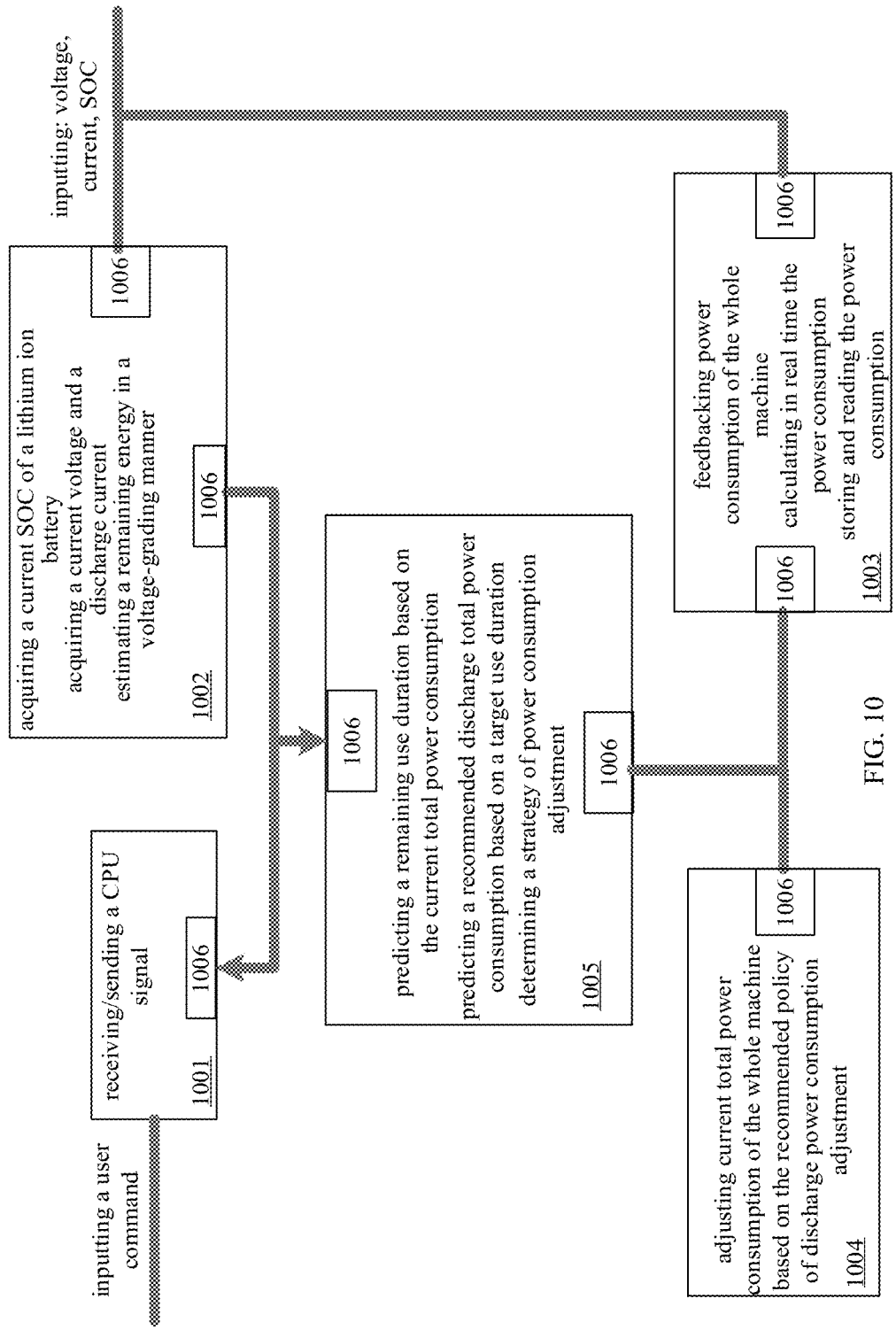
FIG. 10 is a schematic diagram illustrating an apparatus for predicting a remaining use duration according to an example.

FIG. 10 is a schematic diagram illustrating an apparatus for predicting a remaining use duration.

The apparatus includes a display module, a current remaining energy determining module, a current total power consumption determining module and a remaining use duration determining module. The display module may include a UI display and configuration interface unit 1001, which may receive/send a signal of a central processing unit (CPU). The current remaining energy determining module may include a battery current remaining energy determining unit 1002, which is configured to acquire a current SOC of a lithium ion battery, acquire a current voltage and a discharge current, and determine a current remaining energy of the battery, for example, determine the current remaining energy by voltage grading (i.e., through different discharge stages). The current total power consumption determining module includes a current total power consumption determining and storage unit 1003, which may determine a current total power consumption, store and read the determined current total power consumption. The remaining use duration determining module may include a processing unit 1005, which may predict a remaining use duration based on the current total power consumption, predict a recommended discharge total power consumption based on the input reference use duration, and determine a strategy of power consumption adjustment. The reference use duration may include a target use duration, that is, a duration needed by a user input obtained from an input operation of the user. The remaining use duration determining module may also include a power consumption control unit 1004, which is configured to adjust a current total power consumption of the whole machine based on the recommended strategy of discharge power consumption adjustment. Each unit has a communication interface 1006 for communication between the units.

Figure 11:
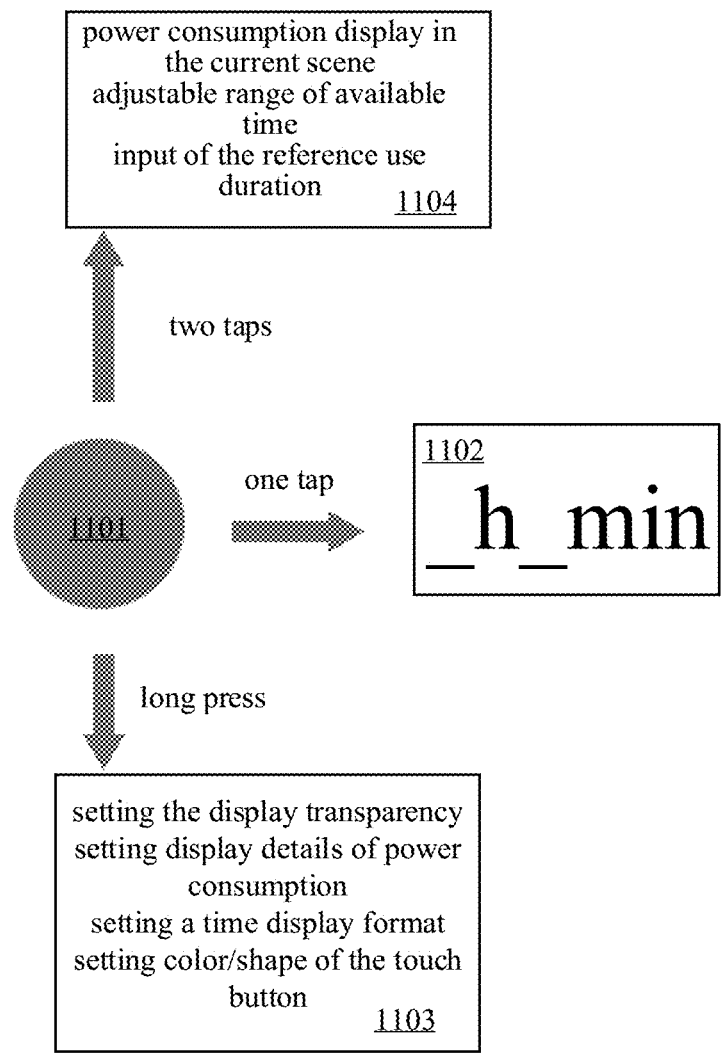
FIG. 11 is a display diagram after a touch operation is acted on a display icon according to an example.

The display icon includes: the displayed remaining use duration in the current scene, and an option for power consumption optimization provided to the user, so that an instruction is sent to a processing unit, and a power consumption of the whole machine is adjusted. The schematic diagram of the UI display interface is as shown in FIG. 11. The remaining use duration 1102 is displayed after one tap, a configuration option for the UI interface is displayed after a long press, a power consumption display and adjustment interface 1104 is displayed after continuous two taps, and the function of each part is as shown in FIG. 11. Display transparency, display details of power consumption, time display format and color/shape of a touch button 1101 may be configured through the configuration option 1103 for the UI interface. Through the power consumption display and adjustment interface, the user may acquire the power consumption and an adjustable range of the available time of each functional module in the current scene. Through the function, the user may input the target available time and send the information to the CPU, and receive power consumption and remaining use time information from the processing unit.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions, such as the above modules 1-4. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, which are directly or indirectly linked together, so as to perform a particular function.

FIG. 11 is a display diagram after a touch operation is acted on a display icon. There may be other form of a display mode and a touch operation mode, in which a reference use duration may be input through the touch operation and a corresponding interface is configured.

Figure 12:
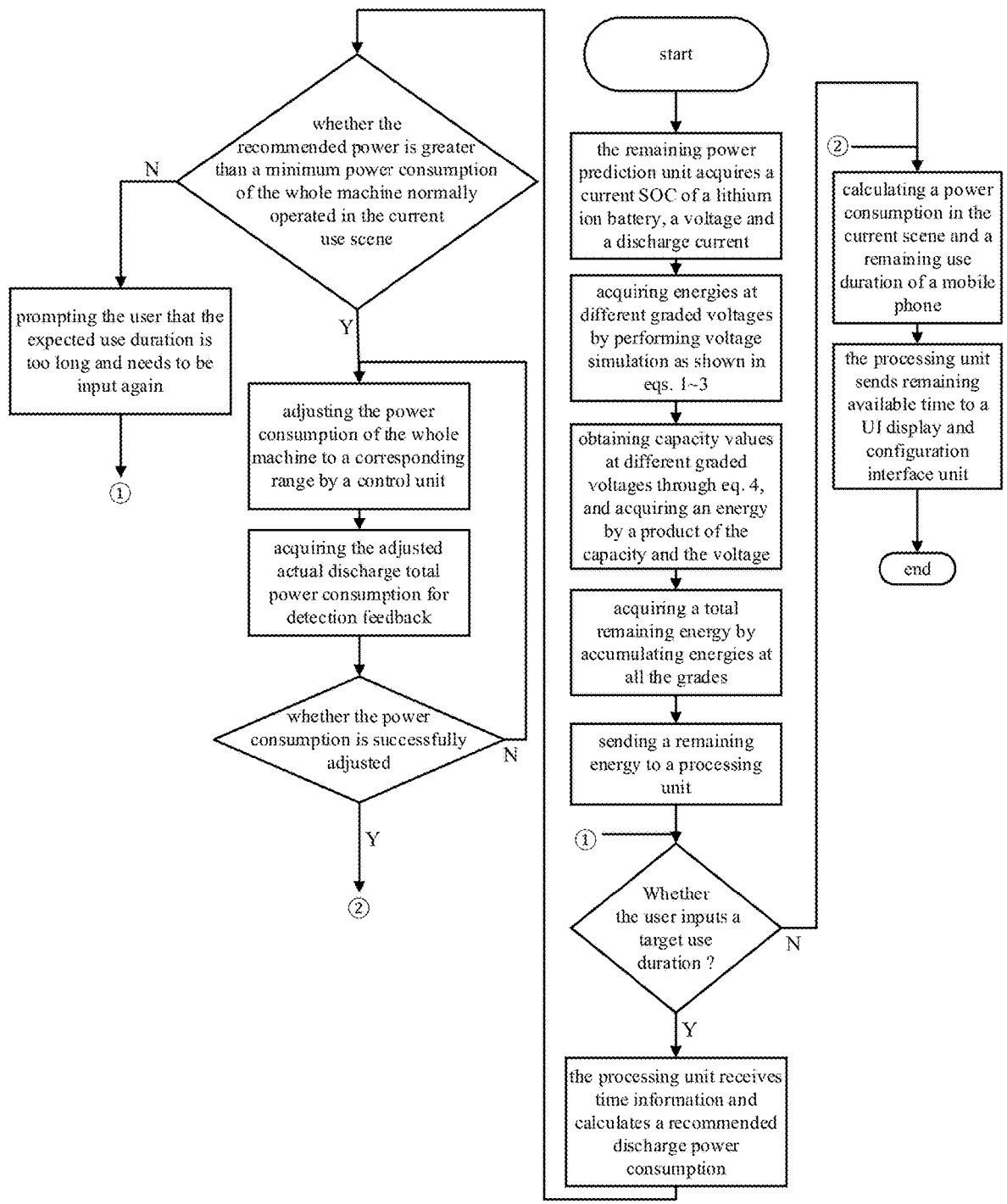
FIG. 12 is another flowchart diagram of predicting a remaining use duration according to an example.

FIG. 12 is another flowchart diagram of predicting a remaining use duration, referring to FIG. 10 to FIG. 12.

The battery remaining energy prediction module may predict a remaining energy of the battery in real time and feed back to the CPU. The CPU acquires information in the current state of a lithium ion battery (e.g., the SOC, voltage and current) as input, and acquires a remaining energy of the lithium ion battery through a voltage grading manner.

$$Ut = U_{ocv} - IR_0, \quad \#(1)$$

$$SOC(t) = SOC(t-T) - \frac{I(t-T)T}{C}, \quad \#(2)$$

$$U_{ocv} = g(SOC), \quad \#(3)$$

where Ut Is a battery voltage, $U_{ocv}$ is an open circuit voltage of the battery, $R_0$ is an internal resistance of the battery, and I is a current of the battery at the current moment; SOC(t) is an SOC at t moment; and T is a time interval of SOC simulation.

Equation 3 represents a correspondence between $U_{ocv}$ and SOC and a simulation curve from the current voltage to the discharge cut-off voltage may be obtained through the Equations 1 to 3, and the remaining energy of the battery is acquired by a voltage-grading manner through the acquired voltage simulation curve.

Voltage grouping is performed on the voltage simulation curve, and the voltage is divided into stages at an interval of 10 mV, each stage corresponding to one discharge stage. Based on the Equations 1 to 3, it may be acquired that discharge time when the voltage is changed by 10 mV. The equation of acquiring a current remaining energy is as shown in Equation 4.

$$Q = \Sigma U_i It_i \# \quad (4),$$

where $U_i$ represents a battery voltage at the i-th discharge stage, $t_i$ represents discharge time at the i-th discharge stage, and I represents a current current at the i-th discharge stage.

So far, predicting a remaining energy of the lithium ion battery is completed through the voltage grading.

The power consumption information storage unit may store a power consumption range of the whole machine in the current scene and feed it back to the CPU.

The power consumption of each module is acquired through the Equation 5, and a total power consumption is acquired through the Equation 6.

$$P_j = U_j I_j \# \quad (5),$$

$$P = \Sigma U_j I_j \# \quad (6)$$

$P_j$ is a current power consumption of a j-th power consumption module, P is a current total power consumption of all modules, $U_j$ represents a current voltage of the j-th power consumption module, and $I_j$ represents a current current of the j-th power consumption module.

The power consumption control unit receives decision information of a processing unit, controls the whole machine to adjust a power consumption, and adjusts the power consumption of the whole machine to a corresponding range. The power consumption may be controlled by CPU reducing a frequency and reducing a screen brightness, so that the remaining use duration of the battery reaches target needs of the user. The adjusted current total power consumption may also be acquired and detected for feedback, so as to determine whether the power consumption adjustment is successful. When the adjusted current total power consumption is within the corresponding range (for example, the first target power consumption range), indicating that adjustment is successful.

$$Pw = UI = \frac{Q}{t_r} \quad \#(7)$$

In the equation, Pw is a target total power consumption, $t_r$ is a target use duration input by the user, that is, a reference use duration, I is a current current of the battery, and U is a current voltage. The target total power consumption is acquired by Equation 7.

The CPU may receive information of the above unit, calculate a remaining use duration and provide a use duration range based on the power consumption range of the current use scene for the user to select.

The remaining use duration is acquired by Equation 8.

$$t_s = \frac{Q}{Pm} = \frac{Q}{UI} \quad \#(8)$$

$t_s$ is a remaining use duration, and $P_m$ is an adjusted total power consumption.

In FIG. 12, the reference use duration includes a target use duration, and the target total power includes a recommended discharge power. The remaining content in FIG. 12 may refer to FIG. 12 and the above embodiments.

With the above solution, a remaining duration is predicted and displayed to the user, for which the electronic device may continue to keep running in the current scene. The option of increasing a use duration is provided to the user for selection, and increasing a use duration is achieved by reducing a screen brightness or a game frame rate. The user is allowed to select the available time, and the system adjusts a power consumption based on the selected available time. The invention may achieve prediction of the accurate available time in the current scene and perform power consumption adjustment based on the time needed by the user.

It should be noted that the terms "first" and "second" in the embodiments of the present disclosure are merely used for the convenience of describing and distinguishing, and do not have other meanings.

Figure 13:
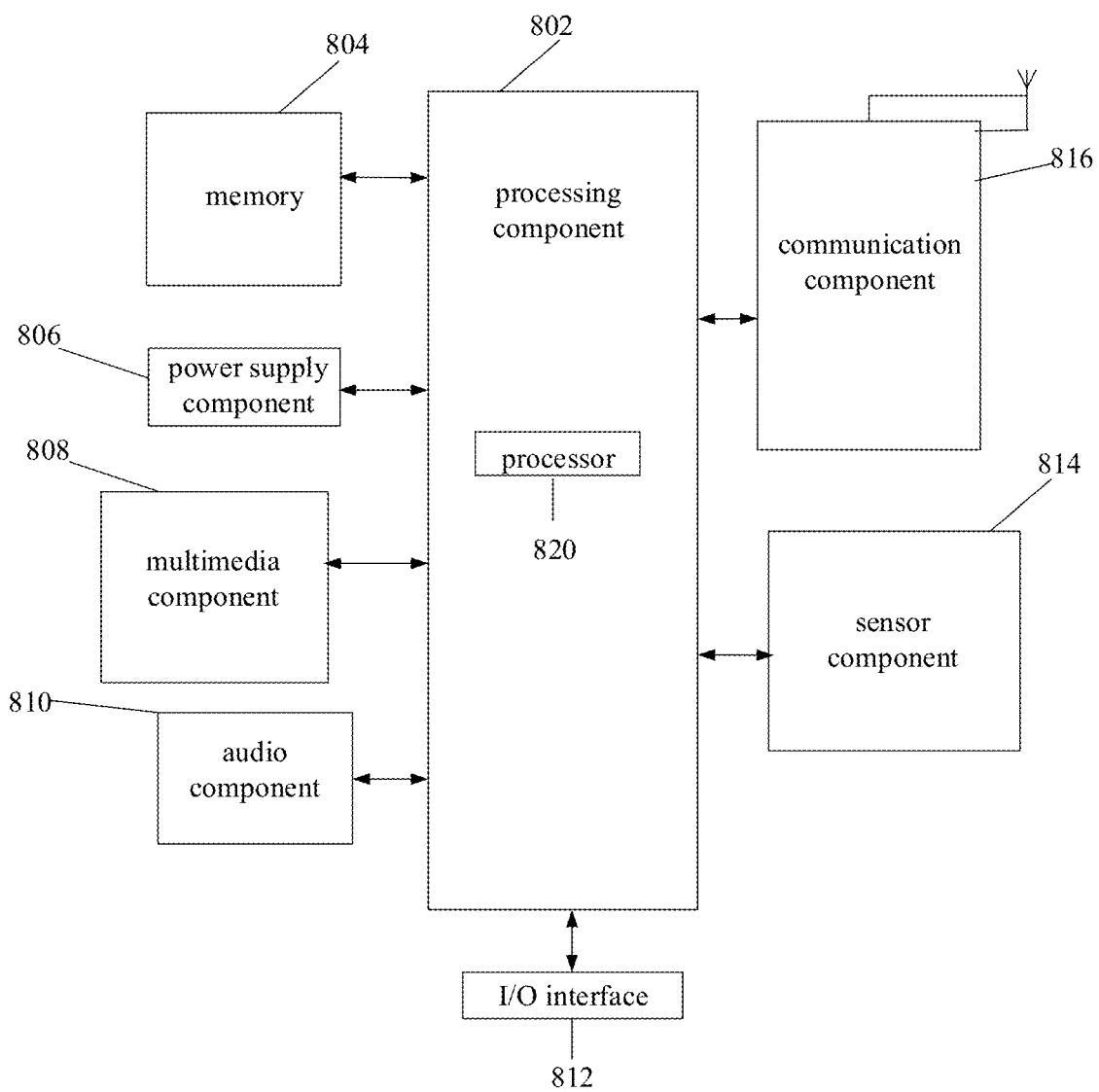
FIG. 13 is a block diagram illustrating a terminal device according to an example.

FIG. 13 is a block diagram illustrating a terminal device according to an example. For example, a terminal device may be a mobile phone, a computer, a digital broadcasting terminal, a messaging device, a game console, a tablet device, a medical device, a fitness equipment, a personal digital assistant, etc.

Referring to FIG. 13, the terminal device may include one or more components: a processing component 802, a memory 804, a power supply component 806, a multimedia component 808, an audio component 810, an input/output (I/O) of interface 812, a sensor component 814, and a communication component 816.

The processing component 802 generally controls an overall operation of the terminal device, such as operations related to display, phone call, data communication, camera operation and recording operation. The processing component 802 may include one or more processors 820 to perform instructions, to complete all or part of steps of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of a terminal device. Examples of the data include the instructions of any applications or methods operated on the terminal device, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 may provide power supply for various components of a terminal device. The power supply component 806 may include power supply management system, one or more power supplies, and other components related to generating, managing and distributing power for the terminal device.

The multimedia component 808 includes an output interface screen provided between the terminal device and the user. In some embodiments, a screen may include a liquid crystal displayed (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 808 includes a front camera and/or a rear camera. When the terminal device is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 810 is configured as an output and/or input signal. For example, the audio component 810 includes a microphone (MIC). When the terminal device is in operation mode, such as call mode, record mode, and speech recognition mode, the microphone is configured to receive the external audio signals. The audio signals received may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The buttons may include but not limited to a home button, a volume button, a start button and a lock button.

The sensor component 814 includes one or more sensors, configured to provide various aspects of status assessment for the terminal device. For example, the sensor component 814 may detect an on/off state of a terminal device and a relative positioning of a component, for example, the component is a display and a keypad of the terminal device, the sensor component 814 may also detect position change of the terminal device or one component of the terminal device, the presence or absence of contact between the user and the terminal device, the orientation or acceleration/deceleration of the terminal device, and the temperature change of the terminal device. The sensor component 814 may include a proximity sensor, which is configured to detect the existence of the objects nearby without any physical contact. The sensor component 814 may further include a light sensor such as CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 may be configured for the convenience of wired or wireless communication between the terminal device and other devices. The terminal device may access wireless networks based on a communication standard, such as WiFi, 4G or 5G, or their combination. In an exemplary embodiment, the communication component 816 receives broadcast signals or broadcast-related information from an external broadcast management system via a broadcast channel. In an exemplary embodiment, the communication component 816 further includes a near field communication (NFC) module to facilitate short-range communication. For example, an NFC module may be implemented based on radio frequency identification (RFID) technology, infrared data association (IRDA) technology, band-wideband (UWB) technology, bluetooth (BT) technology and other technologies.

In an example, the terminal device may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

After considering the specification and practicing the disclosure herein, those skilled in the art will easily think of other implementations. The invention is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary, and the true scope of the present disclosure are given by the appended claims.

It should be understood that the present disclosure is not limited to the precise structure already described above and shown in the drawings, and various modifications and changes may be made without departing from its scope. The scope of this disclosure is limited by the appended claims.

The invention claimed is:

1. A method for predicting a remaining use duration of an electronic device, comprising:
   determining, by the electronic device, a current remaining energy of a battery based on state information of the battery in a current use scene;
   determining, by the electronic device, a current total power consumption of the electronic device in the current use scene;
   in response to detecting an input operation for inputting a reference use duration, determining, by the electronic device, a ratio of the reference use duration to the current remaining energy as a target total power consumption of the electronic device in the current use scene;
   obtaining, by the electronic device, an adjusted current total power consumption by adjusting the current total power consumption based on the target total power consumption;
   predicting, by the electronic device, the remaining use duration based on the current remaining energy and the adjusted-current total power consumption; and displaying, by the electronic device, the remaining use duration through a display icon;

wherein adjusting the current total power consumption comprises:

acquiring a first minimum power consumption for normal operation of the electronic device in the current use scene; and adjusting the current total power consumption to a first range in response to determining that the target total power consumption is greater than or equal to the first minimum power consumption, wherein a lower limit of the first range is set to the target total power consumption in order for the remaining use duration to be less than or equal to the reference use duration.

2. The method according to claim 1, further comprising:
detecting the adjusted current total power consumption; and
readjusting the adjusted current total power consumption to the first range in response to determining that the adjusted current total power consumption is not within the first range.

3. The method according to claim 1, further comprising:
outputting a prompt message in response to determining that the target total power consumption is less than the first minimum power consumption, wherein the prompt message is configured to prompt that the reference use duration is too long.

4. The method according to claim 1, wherein adjusting the current total power consumption comprises:

acquiring a second minimum power consumption for normal operation of the electronic device in a changed use scene in response to detecting that the current use scene is changed; and adjusting the current total power consumption to a second range in response to determining that the target total power consumption is greater than or equal to the second minimum power consumption, wherein a lower limit of the second range is equal to the second minimum power consumption.

5. The method according to claim 1, further comprising:
detecting a touch operation acting on the display icon; and
displaying an input interface of the display icon in response to determining that the touch operation satisfies a first preset operation, wherein the input interface is at least configured to input the reference use duration, and the first preset operation is configured to display the reference use duration.

6. The method according to claim 1, wherein determining the current remaining energy of the battery comprises:

acquiring the state information in the current use scene, wherein the state information comprises: a state of charge (SOC) and a current voltage of the battery;

predicting, based on the SOC, a voltage change state from the current voltage to a discharge cut-off voltage of the battery;

dividing the voltage change state into a plurality of discharge stages based on a reference value of a voltage change; and determining the current remaining energy based on a remaining energy of each of the plurality of discharge stages.

7. The method according to claim 1, wherein displaying the remaining use duration through the display icon comprises:

detecting a touch operation acting on the display icon; and
displaying the remaining use duration in response to determining that the touch operation satisfies a second preset operation, wherein the second preset operation is configured to display the remaining use duration.

8. The method according to claim 7, further comprising:
displaying a configuration interface of the display icon in response to determining that the touch operation satisfies a third preset operation, wherein the third preset operation is configured to display the configuration interface, and the configuration interface is at least configured to set a display effect of the display icon and a display format of the remaining use duration;

detecting a configuration operation acting on the configuration interface; and configuring the display effect and the display format based on the configuration operation.

9. The method according to claim 1, wherein the display icon is a system-level display icon.

10. An electronic device, comprising:
a processor; and
a memory storing non-transitory computer-readable instructions that, when executed by the processor, cause the processor to:

determine a current remaining energy of a battery based on state information of the battery in a current use scene;

determine a current total power consumption of the electronic device in the current use scene;

in response to detecting an input operation for inputting a reference use duration, determine a ratio of the reference use duration to the current remaining energy as a target total power consumption of the electronic device in the current use scene;

obtain an adjusted current total power consumption by adjusting the current total power consumption based on the target total power consumption;

predict the remaining use duration based on the current remaining energy and the adjusted current total power consumption; and control a display of the remaining use duration through a display icon;

wherein the processor is further caused to:
acquire a first minimum power consumption for normal operation of the electronic device in the current use scene; and adjust the current total power consumption to a first range in response to determining that the target total power consumption is greater than or equal to the first minimum power consumption, wherein a lower limit of the first range is set to the target total power consumption in order for the remaining use duration to be less than or equal to the reference use duration.

11. The electronic device according to claim 10, wherein the processor is further caused to:

detect the adjusted current total power consumption; and
readjust the adjusted current total power consumption to the first range in response to determining that the adjusted current total power consumption is not within the first range.

12. The electronic device according to claim 11, wherein the processor is further caused to:

generate a prompt message in response to determining that the target total power consumption is less than the first minimum power consumption, wherein the prompt message is configured to prompt that the reference use duration is too long.

13. The electronic device according to claim 10, wherein the processor is further caused to:

acquire a second minimum power consumption for normal operation of the electronic device in a changed use scene in response to detecting that the current use scene is changed; and adjust the current total power consumption to a second range in response to determining that the target total power consumption is greater than or equal to the second minimum power consumption, wherein a lower limit of the second range is equal to the second minimum power consumption.

14. The electronic device according to claim 10, wherein the processor is further caused to:

detect a touch operation acting on the display icon; and in response to determining that the touch operation satisfies a first preset operation, control a display of an input interface of the display icon, wherein the input interface is at least configured to input the reference use duration, and the first preset operation is configured to display the reference use duration.

15. The electronic device according to claim 10, wherein the processor is further caused to:

acquire the state information in the current use scene, wherein the state information comprises: a state of charge (SOC) and a current voltage of the battery;

predict, based on the SOC, a voltage change state from the current voltage to a discharge cut-off voltage of the battery;

divide the voltage change state into a plurality of discharge stages based on a reference value of a voltage change; and determine the current remaining energy based on a remaining energy of each of the plurality of discharge stages.

16. A non-transitory computer readable storage medium storing instructions, wherein when the instructions are executed by a processor of an electronic device, the processor is caused to perform acts comprising:

determining a current remaining energy of a battery based on state information of the battery in a current use scene;

determining a current total power consumption of the electronic device in the current use scene;

in response to detecting an input operation for inputting a reference use duration, determining a ratio of the reference use duration to the current remaining energy as a target total power consumption of the electronic device in the current use scene;

obtaining an adjusted current total power consumption by adjusting the current total power consumption based on the target total power consumption;

predicting the remaining use duration based on the current remaining energy and the adjusted current total power consumption; and displaying the remaining use duration through a display icon;

wherein adjusting the current total power consumption comprises:

acquiring a minimum power consumption for normal operation of the electronic device in the current use scene; and adjusting the current total power consumption to a range in response to determining that the target total power consumption is greater than or equal to the minimum power consumption, wherein a lower limit of the range is set to the target total power consumption in order for the remaining use duration to be less than or equal to the reference use duration.

* * * * *